United States Patent [19]

Hirose et al.

[11] Patent Number: 4,766,054
[45] Date of Patent: Aug. 23, 1988

[54] OPTICAL RECORDING MEDIUM

[75] Inventors: Sumio Hirose, Yokohama; Hiroshi Ozawa, Isehara; Kenji Abe; Yoichi Hosono, both of Yokohama, all of Japan

[73] Assignees: Mitsui Toatsu Chemical, Inc.; Yamamoto Chemicals, Inc., both of Japan

[21] Appl. No.: 868,630

[22] Filed: May 29, 1986

[30] Foreign Application Priority Data

May 31, 1985 [JP] Japan ................................. 60-116592

[51] Int. Cl.⁴ .......................... G11B 7/24; G03C 1/72; G03C 5/16
[52] U.S. Cl. .................................... 430/270; 430/495; 430/945; 540/139; 346/135.1
[58] Field of Search ...................... 430/945, 495, 270; 346/135.1

[56] References Cited

U.S. PATENT DOCUMENTS

| | | | |
|---|---|---|---|
| 4,458,004 | 7/1984 | Tanikawa | 430/495 |
| 4,492,750 | 1/1985 | Law et al. | 430/495 |
| 4,529,688 | 7/1985 | Law et al. | 430/495 |

Primary Examiner—Paul R. Michl
Assistant Examiner—Mark R. Buscher
Attorney, Agent, or Firm—McGlew and Tuttle

[57] ABSTRACT

Disclosed herein is an optical recording medium permitting recording and reading-out of signals without any reflective layer. The optical recording medium comprises a transparent substrate and an optical recording layer provided directly on the substrate. The recording layer contains at least 80 wt. % of a phthalo-/naphthalocyanine dye represented by the following general formula (I):

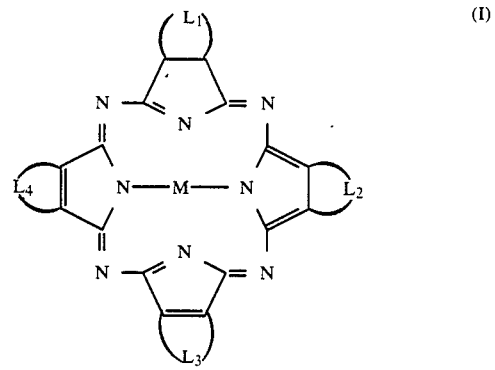

wherein $L_1$, $L_2$, $L_3$ and $L_4$ mean individually

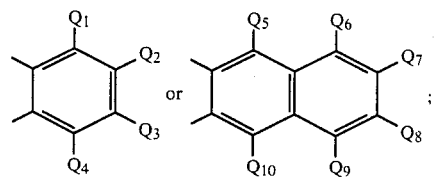

$Q_1$, $Q_2$, $Q_3$, $Q_4$, $Q_5$, $Q_6$, $Q_7$, $Q_8$, $Q_9$ and $Q_{10}$ denote individually a hydrogen atom or

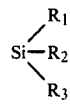

group; $R_1$, $R_2$ and $R_3$ is individually a straight-chain or branched alkyl group having 1–12 carbon atoms, alkenyl group, phenyl group or substituted phenyl group, and two or more

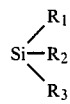

groups are contained on average in the molecule represented by the general formula (1); and M stands for a metal or a metal oxide or metal halide.

9 Claims, 1 Drawing Sheet

OPTICAL RECORDING MEDIUM

BACKGROUND OF THE INVENTION

(1) Field of the Invention

This invention relates write-once optical recording media, and more specifically to optical recording media useful as external memories for computers and for recording various information such as video and audio information as well as to a method for recording information on the media and reading them out from the media.

(2) Description of the Prior Art

As write-once optical recording media of the above-described sort, there have been proposed recording media having inorganic recording layers of thin films of low melting-point metals such as tellurium, tellurium alloys and bismuth alloys, and as disclosed in U.S. Pat. No. 4,298,975 for example, recording media making use of phthalocyanine dyes as recording layers.

These recording media are however accompanied by a problem that their productivities are all low, since their recording layers must be formed in vacuo by vacuum evaporation, sputtering or the like. Furthermore, media having inorganic recording layers are limited in recording density due to the greater thermal conductivities of the recording layers. There is also a potential danger with respect to toxicity since they employ poisonous materials such as tellurium. On the other hand, optical recording media containing phthalocyanine dyes as recording layers usually require a shifting treatment in which recording layers obtained generally by vacuum evaporation are exposed to heat or vapor of an organic solvent, because the optical characteristics of the recording layers are not sensitive to the oscillation wavelengths of semiconductor lasers. This shifting treatment is cumbersome and takes as long as 1–72 hours. Therefore, these phthalocyanine-containing optical recording media have not yet found actual utility.

With a view toward providing a solution to the above-mentioned problems, optical recording media with recording layers formed by coating soluble organic dyes have been proposed. For example, processes making use of the spin coating technique have been developed to coat organic dyes which are soluble in an organic solvent and exhibit absorption in the oscillation wavelength range of semiconductor lasers, such as dithiol metal complexes, polymethine dyes, squarylium dyes and naphthoquinone dyes. Some of these processes have already been practiced. Such conventional recording media however had poor durability as demonstrated by those containing, for example, cyanine or squarylium dyes as recording layers out of the dyes proposed to date or required additionally reflective thin layers made of inorganic materials such as metal or metal oxide, because they had very low reflectances when provided solely with recording layers of dyes such as dithiol metal complexes out of the dyes proposed to date.

For example, U.S. Pat. No. 4,492,750 relates to media which use alkyl-substituted naphthalocyanine dyes. It discloses an optical recording medium having (1) a reflective layer of a material such as Al provided on a glass or polymethyl methacrylate substrate; and (2) a layer of an optical recording composition provided on the reflective layer and containing vapor-treated particles of an alkyl-substituted naphthalocyanine dye, the particle sizes of which range from 0.005 μm to 0.1 μm, dispersed in a polymeric binder. As disclosed in the above U.S. patent, the optical recording layer cannot be formed directly on the substrate and the reflective layer made of an inorganic material such as Al must be formed additionally on the substrate by a vacuum process such as vacuum evaporation. The fabrication process of the optical recording medium is thus rather complicated. In addition, the above optical recording medium is accompanied by a more serious problem. A recording layer making use of an organic dye has an inherent feature, that is, a low thermal conductivity. Hence, it is potentially expected to exhibit high recording sensitivity. When a reflective layer made of a high thermal-conductivity metal or inorganic material is provided, the thermal energy produced by a writing laser beam irradiated onto the recording layer is however caused to dissipate through the reflective metal layer due to the high thermal conductivity of the reflective metal layer, so that the thermal energy is not effectively used for the formation of pits or holes. As a result, the recording sensitivity is reduced to a considerable extent.

Let's now assume that a reflective layer made of an inorganic material such as Al is provided. When a laser beam is irradiated through the substrate for recording signals or reading them out, the laser beam is not allowed to reach the recording layer even if the substrate per se is transparent. This is obvious because the laser beam is shut off by the reflective layer of the inorganic material which practically prevents transmission of light therethrough. Whenever such a reflective layer is provided, it is naturally impossible to perform the recording and reading-out of signals through the associated substrate. Accordingly, the recording and reading-out of signals have to be conducted on the side of the recording layer. In this case, slightest existence of dust or scratches on the surface of the recording layer results in considerable disturbance to the accurate recording and reading-out of signals which take the form of pits or holes. For practical application, the above-mentioned optical recording medium thus requires a dust protective layer as an overcoat on the recording layer. If it becomes feasible to conduct the recording and reading-out of signals by means of a laser beam through a transparent substrate, such a dust protective layer will not be required at all. Because the existence of dust or scratches on the medium surface on the incident side of the laser beam, where the laser beam is still un-focused, has no effect on recording and reading-out of the signals. As mentioned above, optical recording media with reflective layers made of inorganic (metallic) materials such as Al are accompanied by numerous drawbacks. It has thus been desired to develop an optical recording medium which permits recording and reading-out of signals without need for a reflective layer made of an inorganic material and has a highly-durable recording layer formed by coating an organic dye.

SUMMARY OF THE INVENTION

An object of this invention is to provide an optical recording medium which permits recording and reading-out of signals without need for any reflective layer.

Another object of this invention is to provide an optical recording medium which owing to the exclusion of reflective layer, permits recording and reading-out of signals by a laser beam irradiated through its transparent substrate.

A further object of this invention is to provide an optical recording medium which permits high-sensitivity and high-density recording of signals owing to the direct formation of a recording layer, which is formed of an organic dye in the form of a film, on the substrate without any interposition of reflective layer.

A still further object of this invention is to provide an optical recording medium which has a recording layer formed of an organic dye in the form of a film and enjoys high stability to heat and moisture and good long-term durability.

A still further object of this invention is to provide an optical recording medium with a recording layer which can be formed by a coating technique without employing upon any irksome technique such as vacuum evaporation.

Other objects of this invention will become apparent from the following description.

The above and other objects of this invention can be attained by the provision of the following optical recording medium:

An optical recording medium permitting recording and reading-out of signals without any reflective layer, comprising a transparent substrate and an optical recording layer provided directly on the substrate, said recording layer containing at least 80 wt. % of a phthalo/naphthalocyanine dye represented by the following general formula (I):

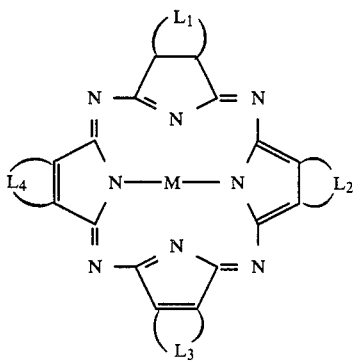
(I)

wherein $L_1$, $L_2$, $L_3$ and $L_4$ mean individually

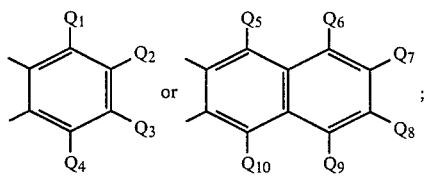

$Q_1$, $Q_2$, $Q_3$, $Q_4$, $Q_5$, $Q_6$, $Q_7$, $Q_8$, $Q_9$ and $Q_{10}$ denote individually a hydrogen atom or

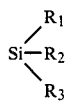

group; $R_1$, $R_2$ and $R_3$ is individually a straight-chain or branched alkyl group having 1–12 carbon atoms, alkenyl group, phenyl group or substituted phenyl group, and two or more

groups are contained on average in the molecule represented by the general formula (1); and M stands for a metal or a metal oxide or metal halide.

In accordance with this invention, by using a specific phthalo/naphthalocyanine dye in a recording layer and preferably, controlling the thickness of the recording layer within a suitable thickness range, an optical recording medium having such high durability as none of optical recording media making use of conventional organic dyes were able to achieve can be provided without need for additional provision of a reflective layer of an inorganic material unlike conventional optical recording media, because the recording layer itself has the function of a reflective layer.

DETAILED DESCRIPTION OF THE INVENTION

Figure 1:
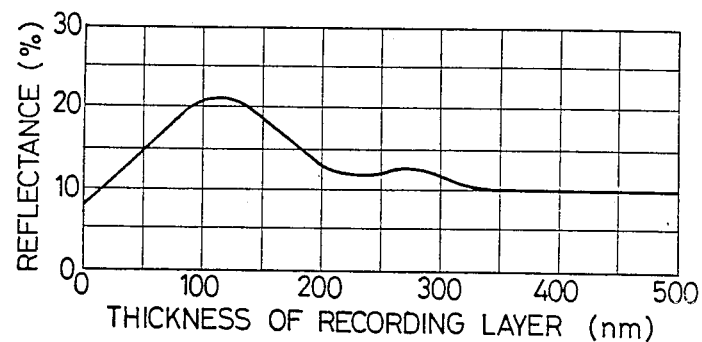
FIG. 1 is a graph showing the thickness dependency of the reflectance of a recording layer of tetra-6-trimethylsilyl-2,3-napthalocyaninevanadyl dye of this invention upon irradiation of light of 830 nm through its associated substrate.

As the transparent substrate useful in the optical recording medium of this invention, it is desirable to employ such a substrate as having a light transmittance of 85% or higher and little optical anisotropy because the writing and reading but of signals are effected therethrough. Illustrative examples of preferred materials include plastics such as acrylic resins, polycarbonate resins, allyl resins, polyester resins, polyamide resins, vinyl chloride resins, polyvinyl ester resins, epoxy resins and polyolefin resins as well as glass. Among these materials, plastics are particularly preferred in view of the mechanical strength of resulting substrates, the readiness in forming pregrooves and recording address signals, and their economical advantage.

These transparent substrates may take either plate-like or film-like forms. They may also be in the form of either disks or cards. Needless to say, they may contain in the surfaces thereof pregrooves for recording positions, pits or holes for address signals, etc. Such pregrooves and pits or holes for address signals may be put by injection molding or casting when the substrates is injection molded or cast. Alternatively, they may also be applied by coating a u.v. curable resin or the like on the substrates, superposing suitable stampers on the coated sides of the substrates and then exposing the coated sides to ultraviolet ray.

In the present invention, a recording layer containing a phthalo/naphthalocyanine dye represented by the following general formula (I) is provided in such a substrate.

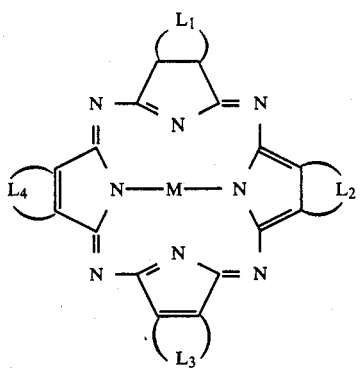

wherein $L_1$, $L_2$, $L_3$ and $L_4$ mean individually

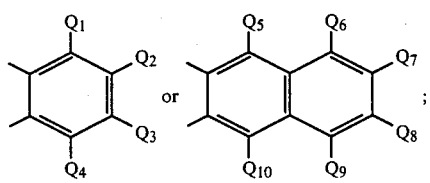

$Q_1$, $Q_2$, $Q_3$, $Q_4$, $Q_5$, $Q_6$, $Q_7$, $Q_8$, $Q_9$ and $Q_{10}$ denote individually a hydrogen atom or

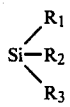

group; $R_1$, $R_2$ and $R_3$ is individually a straight-chain or branched alkyl group having 1–12 carbon atoms, alkenyl group, phenyl group or substituted phenyl group, and two or more

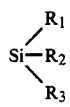

groups are contained on the average in the molecule represented by the general formula (I); and M stands for a metal or a metal oxide or metal halide.

As specific examples of the substituent groups represented by $R_1$, $R_2$ and $R_3$ in the phthalo/naphthalocyanine dye represented by the general formula (I), may be mentioned alkyl groups such as methyl, ethyl, n-propyl, iso-propyl, n-butyl, iso-butyl, sec-butyl, tert-butyl, n-amyl, iso-amyl, sec-amyl, tert-amyl, n-hexyl, iso-hexyl, 1-methyl-1-ethylpropyl, 1,1-dimethylbutyl, n-heptyl, tert-heptyl, octyl, 2-ethylhexyl, nonyl, decyl and dodecyl; alkenyl groups such as vinyl and allyl; a phenyl group; and substituted phenyl groups such as tolyl(methylphenyl) and xylyl(dimethylphenyl).

On the other hand, specific examples of M in the phthalo/naphthalocyanine dye represented by the general formula (I) may include metals of Group Ib of the Periodic Table, such as Cu; Group II metals such as Mg, Ca, Sr, Zn and Cd; Group III metals such as Al, Ga, In and Tl; Group IV metals such as Ge, Sn, Pb and Ti; Group V metals such as Sb, Bi, V, Nb and Ta; Group VI metals such as Se, Te, Cr, Mo and W; Group VII metals such as Mn and Tc; Group VIII metals such as Fe, Co, Ni, Ru, Rh, Pd, Os, Ir and Pt; and the oxides and halides, such as chlorides, bromides and iodides, of these metals. Although these metals and metal oxides and metal halides are generally divalent, they may each be a mixture of single valency and triple valency. Alternatively, they may also be in the form of dimers coupled together by way of an oxygen. In the phthalo/naphthalocyanine dye of the general formula (I), $L_1$, $L_2$, $L_3$ and $L_4$ may each be either the benzene ring or naphthalene ring as described above. In view of wavelengths to be absorbed by the resulting dye layer, it is preferred that at least 3 of $L_1$, $L_2$, $L_3$ and $L_4$ are the above-described naphthalene ring. It is most preferred that $L_1$, $L_2$, $L_3$ and $L_4$ are all the above-mentioned naphthalene ring.

In view of solubility, the dye of this invention may preferably contain two or more silyl groups represented by

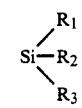

on average per molecule, with 3 or more being preferred. If the carbon number of each of the substituent groups, $R_1$, $R_2$ and $R_3$, of the silyl group exceeds 12, the reflectance of a recording layer containing such a dye is small. It is therefore not preferably that the carbon number of each of the substituent groups exceeds 12. In the general formula (I), M may preferably be Cu, Ni, Mg, Pd, Co, Nb, Sn, In, Ge, Ga, VO or TiO, or the chloride, bromide or oxide of Al, Ga or In in view of absorption and reflection of semiconductor laser beams by the resulting dye layer. VO, TiO, In, In-Cl, In-Br, Al-Cl, Al-Br, Ga-Cl, Ga-Br, Al-O-Al, Ga-O-Ga and In-O-In are particularly preferred.

The above-described phthalo/naphthalocyanine dyes useful in the practice of this invention can be easily synthesized by processes known per se in the art.

For example, the naphthalocyanine dyes may each be prepared by a conventional process described in Zh. Obs. Khim, 42, 696–699 (1972) or the like, for instance, by heating and reacting a 6-silylated-2,3-dicyanonaphthalene represented by the following general formula (II):

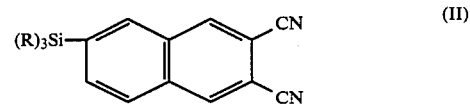

wherein R means a straight-chain or branched alkyl group having 1–12 carbon atoms, phenyl group or substituted phenyl group, with a metal chloride in urea. Incidentally, compounds represented by the general formula (II) may be readily synthesized in accordance with a conventionally-known reaction scheme as illustrated below by way of example.

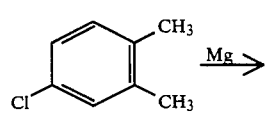

-continued

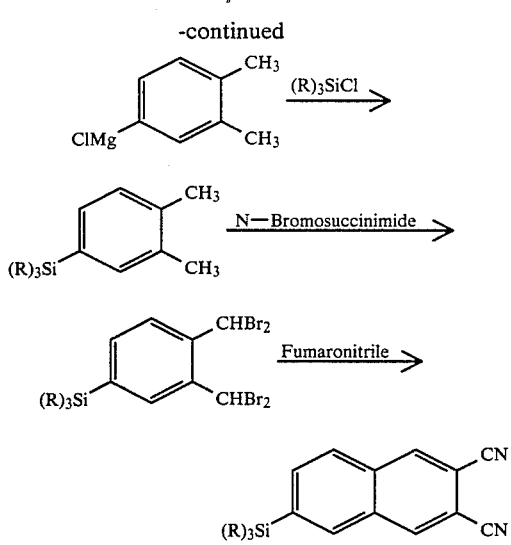

In order to fix (form) a recording layer on a transparent substrate upon fabrication of an optical recording medium of this invention, it is feasible to fix the above-described phthalo/naphthalocyanine dye, for example, by a suitable technique such as vacuum evaporation, sputtering or ion plating. These techniques are however irksome to practice and inferior in productivity. Hence, it is most preferable to effect it by the so-called coating method.

For fixing the recording layer by the coating method, it is necessary to bring a dye solution formed of one of the above phthalo/naphthalocyanine dyes and a subsequently-described organic solvent into contact with the substrate so that the dye is fixed on the substrate. More specifically, this may be done, for example, by letting the dye solution flow down over the substrate or bringing one side of the substrate into contact with the surface of the dye solution and then pulling it up from the dye solution, followed by rotation of the substrate to remove any excess solution, or by sending down the dye solution onto the rotating substrate. Subsequently, the thus-formed recording layer may be dried by heating it if necessary. The organic solvent useful in the formation of the above-mentioned dye solution may be a solvent which is routinely employed to dissolve such phthalo/-naphthalocyanine dyes, for examples, benzene, toluene, xylene, ethylbenzene, methyl ethyl ketone, methyl isobutyl ketone, cyclohexanone, acetylacetone, ethyl acetate, butyl acetate, amyl acetate, cellosolve, methyl cellosolve, butyl cellosolve, cellosolve acetate, diglime, chloroform, carbon tetrachloride, methylene chloride, methylchloroform, trichlene, dimethylformamide or the like. Upon choosing the solvent, it is preferred to employ such a solvent that has solubility for the dyes and needless to say, does not give damages to the pre-groove and the like on each transparent substrate.

In the present invention, the concentration of the dye solution may generally be 0.1-10 wt. % or preferably 0.3-5 wt. % although it may vary depending on the solvent and coating technique. Upon preparation of the dye solution, it may be possible to use one or more other soluble dyes in combination with the dye of this invention in a total amount of 25 parts by weight or less based on 100 parts by weight of the dye of this invention, so as to increase the reflectance of the recording layer or to improve its sensitivity. As dyes usable in combination with those of the present invention, may be mentioned those already known in the art, for example, aromatic or unsaturated aliphatic diamine-metal complexes, aromatic or unsaturated aliphatic dithiol-metal complexes, alkyl-substituted phthalocyanine dyes such as those substituted by t-butyl groups, alkyl-substituted naphthalocyanine dyes, alkoxy-substituted naphthalocyanine dyes, polymethine dyes, squarylium dyes, naphthoquinone dyes, anthraquinone dyes, and so on.

In order to increase the smoothness of a recording layer or to reduce defects such as pinholes in the recording layer in the present invention, it is possible to add a soluble resin such as nitrocellulose, ethylcellulose, an acrylic resin, polystyrene, a vinyl chloride-vinyl acetate copolymer, polyvinyl acetate, polyvinyl butyral or a polyester resin and other additives such as a levelling agent and anti-foaming agent to a solution of the phthalo/naphthalocyanine dye or to a solution of the phthalo/naphthalocyanine dye and the above-mentioned other dye or dyes upon formation of the recording layer. However, an incorporation of one or more of these resins and additives in too larger amounts will result in a significant reduction in the reflectance of the resulting recording layer or will lead to the prevention of the dye particles from uniform dissolution in the recording layer and lead to dispersion of the dye particles so that the recording sensitivity or reflectance will be reduced. It is therefore preferred to limit the total proportion of one or more of such resins and additives to lower than 20 wt. %, preferably below 10 wt. %, more preferably below 5 wt. % in the recording layer. In other words, the proportion of the phthalo/naphthalocyanine dye in the recording layer of this invention is at least 80 wt. % and up to 100 wt. %, preferably 90 wt. %-100 wt. %, more preferably 95 wt. %-100 wt. %.

In the optical recording medium of this invention, it is preferred to conduct the recording and reading-out of signals by a laser beam through the transparent substrate (i.e., laser beam irradiated on the recording layer through the substrate). In this case, if the recording layer becomes too thick, the writing laser beam is absorbed as it passes through the thick recording layer. As a result, the writing laser beam undergoes substantial attenuation and cannot sufficiently reach the surface of the recording layer at which surface the recording layer is in contact with air. The light quantity is hence insufficient on the surface and the temperature increase is thus insufficient, thereby failing to form pits or holes satisfactorily in accordance with signals. As a result, the sensitivity is reduced or even if recording is barely feasible, the S/N ratio (signal-to-noise ratio) is too small upon reading out signals to make the recording medium unsuitable for practical application.

When the recording layer is unduly thin, it is impossible to achieve sufficiently high reflectance on the recording layer due to interference of light as will be discussed herein. Hence, no large S/N ratio can be obtained.

It is therefore necessary to form the recording layer with a suitable thickness. In the optical recording layer of this invention, the thickness of the recording layer may preferably be 50-400 nm or more preferably 60-250 nm as an approximate standard.

There are various methods for the measurement of the thicknesses of layers. It is however very difficult to determine accurate thicknesses by measurement. For the practice of this invention, it is preferred to use values measured by using an Ellipsometer or by measuring cross-sections of media through a microscope. Measurement of thicknesses becomes particularly difficult when pregrooves are formed in substrates. In this case, the measurement can be substituted by determining the thickness of the layer that has been obtained by fixing the same dye on a substrate of the same type without pregrooves.

The principal feature of this invention resides in that the thus-formed recording layer has a high reflectance by itself. Hence, the recording layer itself also serves as a reflective layer.

Unlike conventional optical recording media using an organic dye as recording layer, the optical recording medium of this invention permits the focal point control of a laser beam and the track control of signal-writing positions upon recording signals or reading them out without any reflective layer such as thin metal layer or thin metal oxide or metal alloy layer.

In order to write signals in an optical recording medium, it is usually necessary to irradiate a laser beam focused on its recording layers. Since the dye in the recording layer absorb the laser team and produces heat at the irradiated spot, pits or holes are formed in the recording layer and the reflectance of the recording layer is changed by the formation of said pits or holes. Signals can be read out by detecting the changes in reflectance by means of a laser beam. If these variations in reflectance are small, the signal-to-noise ratio (S/N ratio) is generally small. This is certainly not preferred.

Figure 2:
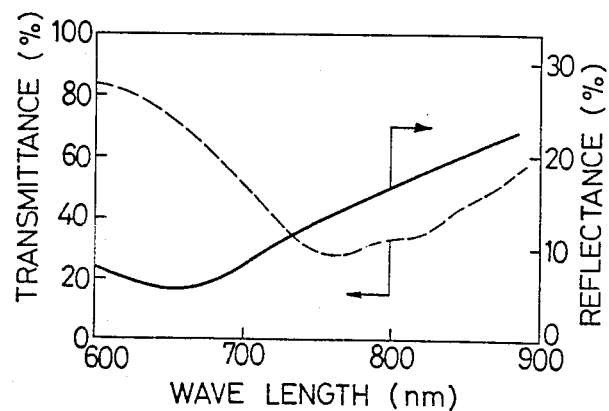
FIG. 2 diagrammatically illustrates the wavelength dependency of the transmittance and reflectance of the same recording layer.

Here, it is noteworthy that the mode of variations in reflectance of an optical recording medium upon performing recording thereon, namely, the mode of variations in reflectance upon formation of pits or holes varies considerably depending on the structure of the recording layer of the optical recording medium. In the case of a double-layered medium composed of a light-reflecting layer and light-absorbing layer such as that disclosed in U.S. Pat. No. 4,219,826, a reflective layer which has previously been covered by the light-absorbing layer is exposed upon formation of pits or holes in the light-absorbing layer. After the recording, the reflectance has thus been increased at spots which correspond to pits or holes. In such a case, it is sufficient for the initial reflectance (i.e., the reflectance prior to the formation of pits or holes) to be approximately of such a level that permits control of a laser beam. On the other hand, in a so-called single-layered optical recording medium in which no reflective layer is contained and the recording layer serves not only as a light-reflecting layer but also as light-absorbing layer as in the present invention, the above description must be reversed completely. By the formation of pits or holes, the reflectance of the recording layer is lowered there. Namely, the reflectance of the recording layer where pits or holes are formed becomes lower than the inherent reflectance. For obtaining a large S/N ratio under the above situation, the reflectance through its associated substrate is at least 10% or preferably 15% or higher in a state prior to writing signals thereon. This reflectance of at least 10% or preferably 15% or higher can be easily achieved by using the dye of this invention and preferably by making a suitable selection as to the thickness of the recording layer. However, the reflectance changes depending on the thickness of the recording layer due to the interference of light reflected at both front and back surfaces of the recording layer. FIG. 1 illustrates, by way of example, results obtained when the present inventors measured the relation of layer thickness and reflectance by using a film formed substantially of tetra-6-trimethylsilyl-2,3-naphthalocyaninevanadyl only. In this case, the measurement of reflectance was conducted by using a light source of the wavelength of 830 nm, fixing a recording layer on a transparent substrate free from pits or holes and pregrooves, and measuring the reflectance through the transparent substrate by means of a spectrophotometer equipped with a 5° regular reflection accessory. The term "reflectance" as used herein shall be considered to mean a value measured in the above manner. When the light is irradiated through the substrate, its reflection takes place at the interface between the substrate and recording layer and also at the interface between the recording layer and air. These two rays of reflected light interfere each other. Therefore, the reflectance of the recording layer varies depending on its thickness as illustrated in FIG. 1. It is hence possible to obtain a large reflectance by making a suitable selection as to the thickness of the recording layer. On the other hand, FIG. 2 shows the wavelength dependency of the reflectance and transmittance of a recording layer obtained by coating tetra-6-trimethylsilyl-2,3-naphthalocyaninevanadyl to a thickness of 110 nm on a smooth acrylic resin substrate of 1.2 mm thick. This recording layer had a broad absorption in the wavelength range of 730–850 nm. This absorbing wavelength range is in good conformity with the oscillation wavelengths of semiconductor lasers. The reflectance in this wavelength range is above 13%. A reflectance of 15% or greater is achieved especially within a range of 780–850 nm. As apparent from FIG. 2, it is understood that the recording layer has sufficient absorption and reflectance in the oscillation wavelength range of laser beams even when it has not been vapor-treated.

When a polymeric binder is contained in a large proportion of 40–99 wt. % or preferably 60–99 wt. % as disclosed in U.S. Pat. No. 4,492,750, the associated dye is not evenly dissolved in the binder and particles of the dye are in a state dispersed therein. Thus, the spectroscopic characteristics of the dye are not in agreement with the oscillation wavelength of a laser beam unless the dye particles are vapor-treated. Where the proportion of the resinous binder is in a far smaller proportion of from 0 wt. % (inclusive) to 20 wt. % (exclusive) as in the present invention, the present inventors have unexpectedly found that large absorption takes place in the oscillation wavelength range of laser beams without vapor treatment even if the similar dye is employed. Although the reasons for the above phenomenon have not been fully made clear, the state of intermolecular association of the dye or its crystalline structure appears to change considerably depending on the amount of the associated polymeric binder. Another significant feature of this invention resides in the possibility of formation of a recording layer by practically using only the phthalo/naphthalocyanine dye without substantial use of any resinous binder.

When a layer formed singly of an organic dye is prepared by vacuum evaporation or the like, the resultant layer is usually inferior in mechanical properties. For this reason, a resin has heretofore been added as a binder in a large amount to the organic dye to improve the mechanical properties of the resulting dye layer. The recording layers, formed practically of the specific phthalo/naphthalocyanine dyes only, have been found to have sufficient mechanical properties, though they contain far smaller amounts of a binder, or do not contain such a binder at all. Therefore, they can be successfully used as optical recording media.

When the optical recording medium of this invention is used, it may be feasible to provide an anti-reflecting layer to improve its S/N ratio. Further, to protect the recording layer, it may be feasible to coat a u.v. curable resin on the recording layer or to apply a protective sheet on the surface of the recording layer or to bond two optical recording media with their recording layers facing inside. When two optical recording media are bonded to each other it is desirable to bond them together with an air gap on their recording layers.

By the way, the laser beam useful in recording or reading out in the present invention is a semiconductor laser beam having an oscillation wavelength in the range of 730–870 nm or preferably 750–860 nm. When recording is made at 5 m/s for example, the laser output on the surface of the substrate may be about 4 mW–12 mW or so. The reading output may be about one tenth the output of the laser beam upon recording and may thus be about 0.4–1.2 mW or so.

Certain preferred embodiments of this invention will hereinafter be described by the following Examples.

EXAMPLE 1

(1) After a solution consisting of 1 part by weight of tetra-6-triethylsilyl-2,3-naphthalocyaninevanadyl dye and 99 parts of chloroform was dripped to a central part of an acrylic resin substrate having a thickness of 1.25 mm and a diameter of 200 mm, the acrylic resin substrate was rotated for 15 seconds at 2000 rpm. The acrylic resin substrate was then dried for 10 minutes in an atmosphere of 40° C. to fix a recording layer, which consisted practically of tetra-6-triethylsilyl-2,3-naphthalocyaninevanadyl dye only, on the acrylic resin substrate. The thickness of the recording layer was found to be 110 nm by a measurement with an Ellipsometer. The reflectance of light having a wavelength of 830 nm through the acrylic resin substrate was 21%.

(2) The thus-fabricated optical recording medium was mounted on a turn table with its recording layer up. While it was rotated at 900 rpm, pulsated signals of 1 MHz (duty: 50%) were recorded by means of an optical head equipped with a semiconductor laser having an oscillation wavelength of 830 nm and an output of 8 mW on the surface of the substrate. During the recording, the optical head was controlled in such a way that the laser beam was allowed to focus on the recording layer through the acrylic resin substrate. Thereafter, the above-recorded signals were read-out by using the same apparatus in the same manner except that the output of the semiconductor laser was reduced to 0.7 mW on the surface of the substrate. In the above reading-out, the signal-to-noise ratio (S/N ratio) was 54 dB. Extremely good writing and reading of signals were performed.

(3) In order to investigate the durability of the optical recording medium, it was left over for 4 months under atmosphere condition of 60° C. and 95% R.H. and signals were then recorded in an unrecorded area in the same manner as above. The signals recorded before the durability test and those recorded subsequent to the durability test were read-out respectively. They gave S/N ratios of 52 dB and 53 dB respectively. Thus, the change caused by the durability test was very small.

(4) Furthermore, the shapes of pits at the signal-recorded area were observed by a scanning electron microscope after the durability test. Their shapes were substantially the same as those recorded before the durability test. In the case of an optical recording medium having a thin film of an inorganic material such as Te as a recording layer, swelling or rim takes place along the edges of pits, perhaps, due to the large thermal conductivity of the recording layer. This swelling causes noise. However, such swelling was practically unobserved and the pits maintained very good configurational integrity.

EXAMPLE 2 & COMPARATIVE EXAMPLE 1

Optical recording media with recording layers formed practically of naphthalocyanine dyes only were fabricated in the same manner as in Example 1 except that acrylic resin substrate having a thickness of 1.2 mm and a diameter of 120 mm were used, naphthalocyanine dyes having the alkylsilyl groups and Ms shown in Table 1 were used, carbon tetrachloride was used as a solvent, and the concentrations of the dyes were changed. The reflectances and S/N ratios of the optical recording media were then investigated. Results are summarized in Table 1.

As apparent from Table 1, all S/N ratios fell within the range of 47–53 dB in the Invention Example while the S/N ratios were as small as 30–35 dB in the Comparative Example. Since the S/N ratio required usually for an optical recording medium is said to be at least 45 dB, it is understood that the products of the Referential Example are not suitable at all for actual application.

TABLE 1

| | | | Results | | | |
|---|---|---|---|---|---|---|
| Run No. | Naphthalocyanine dye Silyl group | M | Layer thickness* (nm) | Reflectance (%) | S/N (dB) | Remarks |
| 1 | trimethylsilyl | Cu | 90 | 20 | 52 | Invention |
| 2 | trimethylsilyl | Ni | 150 | 18 | 49 | Example 2 |
| 3 | trimethylsilyl | Co | 70 | 17 | 50 | |
| 4 | tripropylsilyl | In | 120 | 22 | 53 | |
| 5 | triphenylsilyl | VO | 220 | 15 | 47 | |
| 6 | tributylsilyl | Al—Cl | 120 | 17 | 50 | |
| 7 | trihexylsilyl | Pb | 120 | 18 | 52 | |
| 8 | trimethylsilyl | Cu | 40 | 12 | 35 | Comparative |
| 9 | trimethylsilyl | " | 450 | 9 | 30 | Example 1 |

*Measurement data by Ellipsometer.

EXAMPLE 3

In the same manner as in Example 1, a 1 wt. % solution of tetra-6-trimethylsilyl-2,3-naphthalocyaninevanadyl in carbon tetrachloride was coated on an acrylic resin substrate having a thickness of 1.25 mm and a diameter of 200 mm and a spiral pregroove (width: 0.8 μm, depth: 0.07 μm, pitch interval: 2.5 μm) and also on an acrylic resin substrate of the same type as the former acrylic resin substrate except for the exclusion of the pregroove. The thus-coated acrylic resin substrates were dried to fabricate optical recording media each of which had a recording layer consisting practically of tetra-6-trimethylsilyl-2,3-naphthalo-cyaninevanadyl only. In the case of the acrylic resin substrate with the pregroove, the recording layer was fixed on the pre-grooved side. The thickness of the recording layer was 130 nm as measured by an Ellipsometer and its reflectance was 22% (Note: The measurements were made on the optical recording medium obtained from the pregroove-free substrate). By using these optical recording media, their S/N ratios were measured by writing and reading signals in the same manner as in Example 1. Their durability tests were conducted in the same manner as in Example 1. In addition, their pits were also observed in the same manner as in Example 1. Results are summarized in Table 2.

TABLE 2

| Substrate | Results S/N (dB) | | | Observation by electron microscope |
|---|---|---|---|---|
| | Reading-out before durability test | Reading-out after durability test | Reading-out of signals recorded after durability test | |
| With pregroove | 54 | 53 | 52 | No swelling along edges of pits |
| Without pregroove | 52 | 50 | 50 | |

EXAMPLE 4

An optical recording medium was fabricated and evaluated in the same manner as in Example 1 except that phthalo/naphthalocyanine InCl containing, on average, three trimethylsilylnaphthalene rings and one unsubstituted benzene ring per molecule was used. The thickness of the resultant recording layer was 120 nm while the reflectance and S/N ratio were 19% and 52 dB respectively.

EXAMPLE 5 & COMPARATIVE EXAMPLE 2

By using acrylic resin substrates having a thickness of 1.2 mm and a diameter of 120 im and carbon tetra-chloride solutions composed respectively of tetra-6-trimethylsilyl-2,3-naphthalocyaninevanadyl as a dye and binders of the types and amounts given in Table 3, optical recording media were prepared in the same manner as in Example 2. The thicknesses and reflectances of the recording layers are summarized in Table 3. By using the recording media, recording and reading-out of signals were performed in the same manner as in Example 2. Results are also summarized in Table 3.

TABLE 3

| Run No. | Composition of recording layer (wt. parts) | | | Results | | | Remarks |
|---|---|---|---|---|---|---|---|
| | Amount of dye | Binder | | Layer thickness (nm) | Reflectance (%) | S/N (dB) | |
| | | Kind | Amount | | | | |
| 10 | 95 | Polystyrene | 5 | 90 | 20 | 51 | Invention |
| 11 | 90 | Polystyrene | 10 | 110 | 17 | 49 | Example 5 |
| 12 | 50 | Polystyrene | 50 | 100 | 9 | Unable to record | Comparative Example 2 |
| 13 | 20 | Polystyrene | 80 | 100 | 8 | | |
| 14 | 10 | VC-VA copolymer* | 90 | 110 | 7 | | |

*83:17 (by wt. %) copolymer of vinyl chloride and vinyl acetate.

Recording was impossible in Comparative Example 2 (Run Nos. 12–13) of Table 3. It was feasible to control the focal point of the laser beam upon recording and thus pits or holes were formed, but it was unable to read out signals. Since the amounts of the resinous binders were considerably greater in Comparative Example 1 compared with those in Example 5 of this invention, the initial reflectances were as low as 7–9%. Even if pits or holes were formed, the reductions in the reflectances due to the formation of such pits or holes are believed to be slight. Hence, the resultant changes in reflectance do not appear to be large enough to take them out as signals.

COMPARATIVE EXAMPLE 3

By using a 5% chloroform solution of the same naphthalocyanine dye as that employed in Example 3, an optical recording medium was fabricated in the same manner as in Example 1. The thickness of the recording layer in the thus obtained optical recording medium was 500 nm. On the other hand, the reflectance was 10%. By using the optical recording medium, recording and reading-out of signals were performed in the same manner as in Example 1 to determine its S/N ratio. The S/N ratio was as small as 30 dB and noise was large.

COMPARATIVE EXAMPLE 4

After reflective layers of aluminum on acrylic resin substrates of the same type as those used in Example 1 by vacuum evaporation were made, recording layers were formed on the reflective layers by using the same dye solutions as those employed respectively in Example 3 and Comparative Example 1 in the same manner as in Example 1 so that optical recording media were fabricated. The thicknesses of the thus-obtained recording layers were 130 nm and 500 nm respectively. Their reflectance were 27% and 12% respectively. By using these recording media, signals were recorded and read-out in the same manner as in Example 1 except that the semiconductor laser beam was irradiated directly to the recording layers. Their S/N ratios were very small, i.e., 28 dB and 20 dB respectively. Further, signals were recorded and read-out at 450 rpm. Their S/N ratios were improved but were still as small as 40 dB and 30 dB respectively.

It is accordingly understood that the forming of an additional reflective layer of a metal or the like results in a decrease in recording sensitivity due to the high thermal conductivity of the reflective layer and recording of signals is not feasible at a high rotation velocity and even when recorded at a low rotation velocity, extremely small S/N ratios are only available.

As has been described above, the optical recording medium of this invention permits recording and reading of signals without a reflective layer such as thin metal film or thin metal oxide film because its recording layer has a sufficient reflectance by itself. Furthermore, owing to its sufficient reflectance, a large S/N ratio can be obtained. In addition, swelling is not observed at the edges of pits in a recorded area. This indicates that a large S/N ratio can be obtained and at the same time, the recording density can be improved.

Moreover, optical recording media of this invention can be readily mass-produced by the coating technique, and are stable to heat and moisture and hence usable over long periods of time.

What is claimed is:

1. An optical recording medium permitting recording and reading-out of signals without any reflective layer, comprising a transparent substrate and an optical recording layer provided directly on the substrate, said recording layer containing at least 80 wt. % of a silyl-group-substituted phthalo/naphthalocyanine dye represented by the general formula

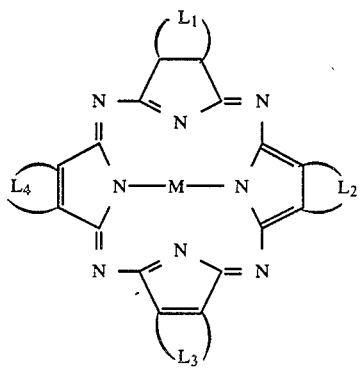 (I)

wherein M is a metal, metal oxide or metal halide; $L_1$, $L_2$, $L_3$ and $L_4$ are

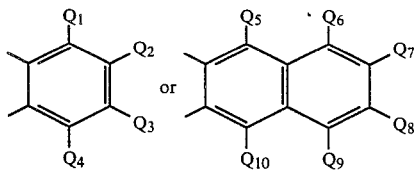

in which each one of Q1 through Q10 is a hydrogen atom or a

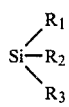

group; R1, R2 and R3 each representing a straight chain, a branched alkyl group having 1 to 12 carbon atoms, an alkenyl group, a phenyl group or a substituted phenyl group; and wherein in the molecule represented by said general formula (I) there are contained, on the average, two or more

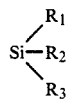

groups.

2. An optical recording medium as claimed in claim 1, wherein at least three of $L_1$, $L_2$, $L_3$ and $L_4$ in the silyl-group-substituted phthalo/naphthalocyanine dye represented by the general formula (I) are the naphthalene ring:

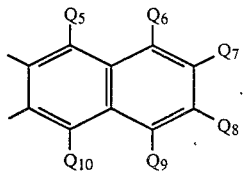

3. An optical recording medium as claimed in claim 2, wherein $L_1$, $L_2$, $L_3$ and $L_4$ in the silyl-group-substituted phthalo/naphthalocyanine dye represented by the general formula (I) are each the naphthalene ring:

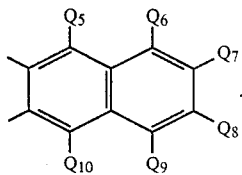

4. An optical recording medium as claimed in claim 1, wherein three or more

groups are contained on average per molecule of the dye represented by the general formula (I).

5. An optical recording medium as claimed in claim 1, wherein the thickness of the recording layer is 50-400 nm.

6. An optical recording medium as claimed in claim 5, wherein the thickness of the recording layer is 60-250 nm.

7. An optical recording medium as claimed in claim 1, wherein the transparent substrate is a transparent plastic substrate.

8. An optical recording medium as claimed in claim 1, wherein the recording and reading-out of the signals are effected by a light beam through the transparent substrate.

9. A method for recording signals, which comprises:
   (a) providing the optical recording medium of claim 1;
   (b) irradiating a convergent semiconductor laser beam through the transparent substrate of the optical recording medium for writing the signals; and
   (c) forming pits or holes in the optical recording layer in accordance with the signals by the laser beam irridiated through the transparent substrate, which pits or holes can be read out by a laser beam irradiated thereto through the transparent substrate.

* * * * *